FREDERICK L. BEEBEE,
INVENTOR.

BY

ATTORNEY.

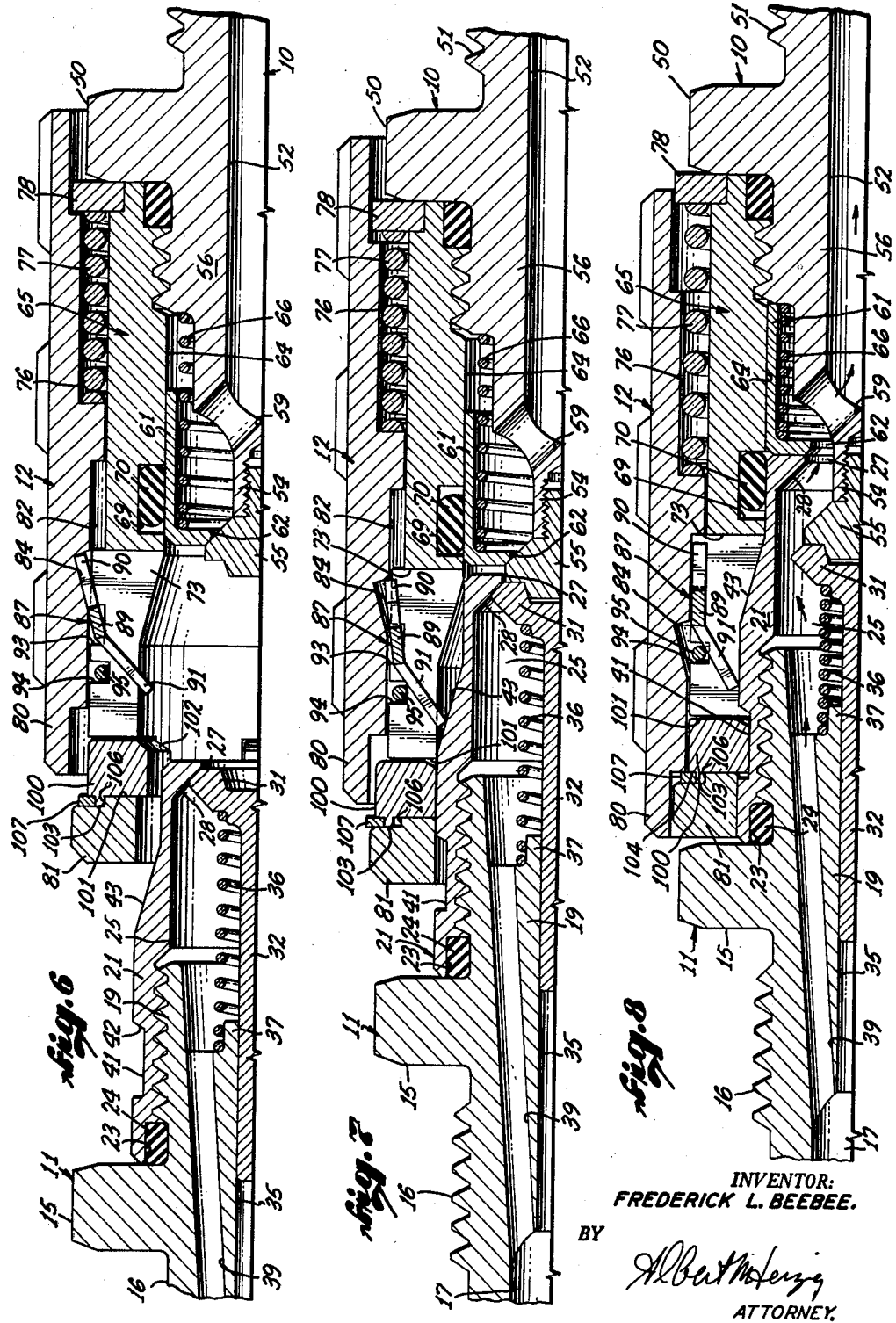

United States Patent Office 3,195,935
Patented July 20, 1965

3,195,935
HYDRAULIC PIPE COUPLING HAVING AN AUTOMATICALLY ACTUATED LOCKING SLEEVE
Frederick L. Beebee, La Canada, Calif., assignor to The Deutsch Company, Los Angeles, Calif., a corporation of California
Continuation of application Ser. No. 93,517, Mar. 6, 1961. This application Apr. 21, 1964, Ser. No. 366,942
4 Claims. (Cl. 285—316)

This application is a continuation of my copending application Serial No. 93,517, filed March 6, 1961, for Hydraulic Coupling and now abandoned.

This invention relates to an improved hydraulic coupling for coupling together conduits for any type of fluid, such as liquid or gaseous fluid and this may be in hydraulic or pneumatic applications.

The hydraulic coupling is of the quick-disconnect type and the primary objective is to realize a quick-disconnect hydraulic coupling of this type in which the coupling and uncoupling can be effected without leakage and without inclusion of air at the time the coupling or uncoupling is done.

Another object is to provide an improved coupling as in the foregoing providing male and female coupling members or fittings, each of which is provided with a valve which valves open simultaneously without leakage at the time of coupling and which close simultaneously at the time of uncoupling.

Another object is to provide an improved coupling as in the foregoing embodying the male and female fittings or members and having an improved locking sleeve and locking device for locking the members in coupled relationship.

Another object is to provide an improved coupling as in the foregoing embodying the improved locking sleeve and further embodying automatic operation of the locking sleeve and improved latching means for unlatching the locking sleeve to allow it to operate.

Further objects and additional advantages will become apparent from the following detailed description and annexed drawings, wherein:

FIG. 6 is a sectional view similar to that of FIG. 1 but showing the parts in uncoupled relationship;

FIG. 7 is a view similar to that of FIGS. 1 and 7 showing the parts just before coupling; and FIG. 8 is an enlarged view like that of FIG. 1 showing the parts in coupled relationship.

Figures 1, 2, 3, 4, 5:
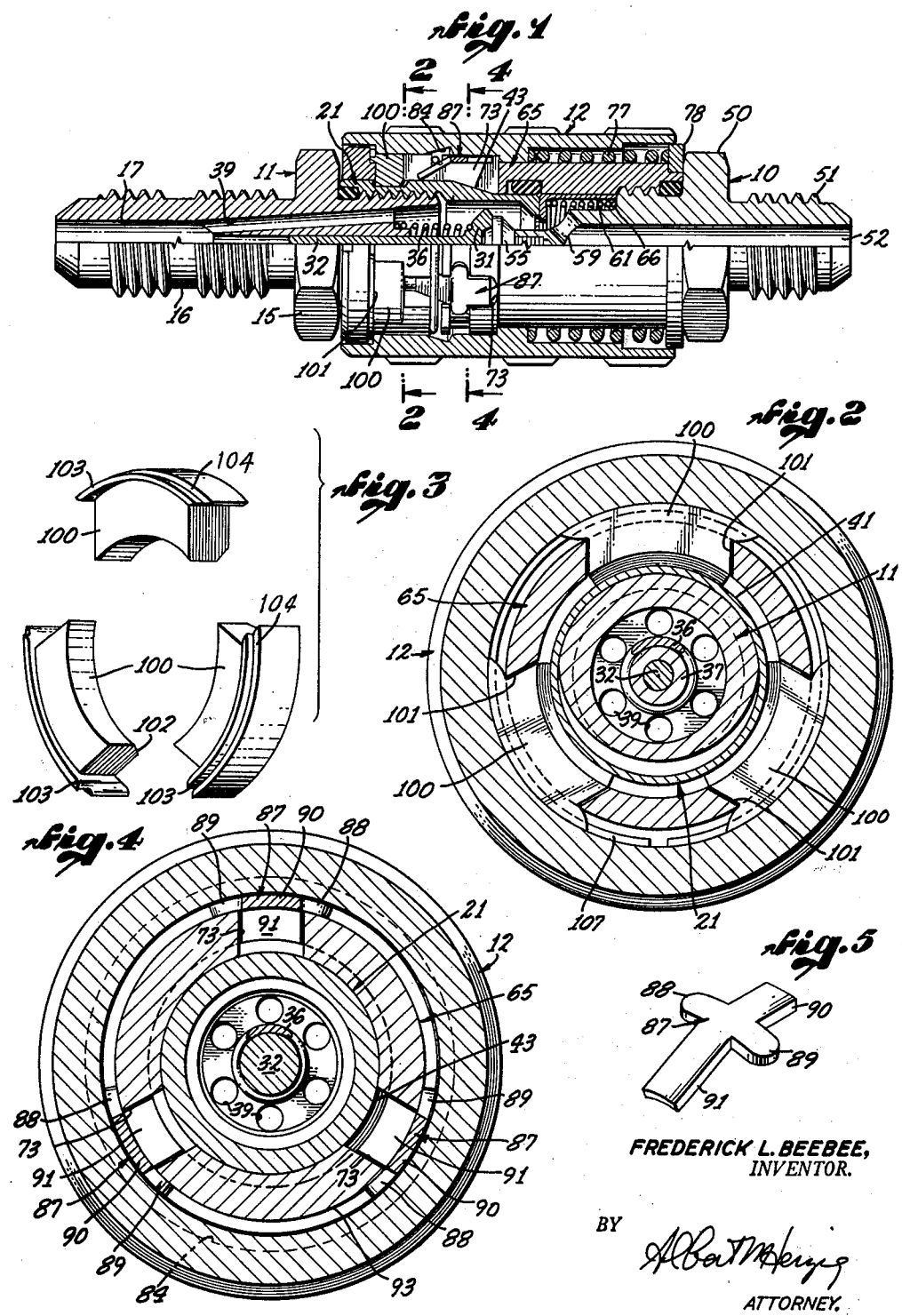
FIG. 1 is a cross-sectional view of the coupling of the invention in coupled relationship.
FIG. 2 is a sectional view taken along the line 2—2 of FIG. 1.
FIG. 3 is a perspective view of the locking shoes used in the coupling.
FIG. 4 is a sectional view taken along the line 4—4 of FIG. 1.
FIG. 5 is a detail perspective view of the latching key.

Referring now more in detail to FIGS. 1, 6, 7 and 8 of the drawings, the construction and the operation of the coupling will be understood from these figures. As seen in these figures, the coupling comprises a female coupling member 10, a male coupling member 11 and a coupling or locking sleeve member 12.

The male coupling member has a wrench receiving part 15 and a threaded nipple 16. The threaded nipple 16 has a bore 17. The male coupling member has a threaded part 19 beyond the wrench receiving part 15 and this part is threaded into a sleeve or cylindrical member 21. One end of the sleeve part 21 has an annular groove 23 and fitting in this groove is a sealing ring 24 which seals the parts 19 and 21 together.

The part 21 has a bore 25 and an orifice 27 in its end.

The inner surface of the end of the part 21 adjacent the orifice 27 has a slant as shown at 28 and it forms a valve seat cooperating with a valve member 31 which operates within the part 21.

The valve member 31 is on a stem 32 which slides in a counterbore 35 in the male member 17. The valve is normally biased in closing direction by a coil spring 36 which engages a shoulder on the valve and a shoulder formed by an extending boss 37 on the center part of the member 11. The bore 17 connects to the space within parts 19 and 21 by a plurality of angularly spaced circumferentially arranged slanting bores 39.

The body part 21 has an annular groove as shown at 41 and the forward edge of this groove has a slight bevel as shown at 42. The sleeve or body part 21 has a slanting or bevelled ramp surface as shown at 43. The function of the parts just described will be described presently.

The female member 10 has a wrench receiving part 50 and a threaded nipple 51 having a central bore 52. The inner end part of the female member 10 is of smaller diameter as indicated at 54 and on the end of this part is a circular member 55 which may be termed either a valve or a valve seat. The part of the female member to the left of the wrench receiving part 50 is designated by the numeral 56 and it is externally threaded as shown. The female member has a tapered part between the parts 56 and 54 and in this tapered part are a plurality of orifices 59 providing for fluid flow into or out of the bore 52 as will be described presently.

Numeral 61 designates a cylindrical sliding sleeve valve member or a valve seat member, the end of which has an orifice as designated at 62. This sliding valve member fits within a bore 64 in an outer part 65 of the female member which is threaded onto the part 56. Within the valve member 61 is a coil spring 66 which normally urges the valve member 61 in a direction causing it to seat against the bevel on the underside of the valve member or head 55 as may be seen in FIGS. 6 and 7.

The part 65 of the female member has an annular groove 69 in which is a sealing O-ring 70 which normally seals against the valve member 61 in the female member but which seals against the end of part 21 of the male member when the members are coupled and in relationship for fluid flow. This relationship is shown in FIGS. 1 and 8.

The body part of the female member has angularly spaced axial slots as designated at 73 which are adjacent the part 21 of the male member when the parts are in coupled relationship as shown in FIGS. 1 and 8. The locking sleeve 12 has a bore which fits around the part 65 of the female member and it has a counterbore 76 in which is a coil spring 77 which normally biases the locking sleeve 12 to the left as shown in the figures. The other end of this coil spring engages a snap ring 78 fitting in a groove in the body part 65. The sleeve 12 has another larger counterbore adjacent the ring 78 so as to fit over it.

At the other end of the sleeve 12 it has an extending skirt 80 around another counterbore and this skirt is of a size to fit around and engage with a circular rib or shoulder 81 at that end of the female part of the coupling. The sleeve has a counterbore 82 which is adjacent the part 21 of the male member when the parts are in coupled relationship. This counterbore has in it a group of angularly spaced conical grooves 84 alignable with the slots 73 in the parts 65 of the female member. Numeral 87 designates one of a similar number of latching keys of cruciform shape as shown in FIG. 5 which cooperate with the grooves 84 to latch the sleeve 12. The keys 87 have laterally extending lugs 88 and 89, a forwardly extending ear or lug 90 and a rearwardly extending lug 91 which is bent downwardly as shown in FIG. 5. The body part 65 of the female member has an annular groove 93 in which are received the laterally extending lugs 88 and 89. The extending lugs 91 extend inwardly in the slots 82 so that they can ride on the ramp 43 of the body part 21 of the male coupler. The keys 87 thus may pivot about the lugs 88 and 89 as an axis, from a position wherein the forwardly extending ear or lug 90 is flush against the interior of the sleeve 12 as shown in FIGS. 1 and 8 to the tilted position as shown in FIG. 6 wherein the extending ear or lug 90 is latched in the groove 84 on the inside of the sleeve 12. The part 65 of the female coupler has a circumferential slot 94 which in the position of the parts as shown in FIGS. 1 and 8 is opposite the groove 84 in the sleeve 12. In this groove is a flexible snap ring 95 which is adjacent the extending lugs 91 of the keys 87 and when the parts are uncoupled so that the lugs 91 can ride down the ramps 43, the ring 95 will impart sufficient rotational movement to the keys 87 so that the extending lugs 90 move into the groove 84, the sleeve 12 having been manually moved back against the spring 77, the keys 87 then latching the sleeve 12 in the retracted position.

Numeral 100 designates one of a group of three locking lugs or shoes, each having a conformation shown in FIG. 3. These shoes are arcuate as shown in FIG. 3 and have the cross-sectional configuration as shown in the other figures. These shoes are received in spaced arcuate openings as designated at 101 in the body part 65 of the female member. Each of these shoes has one corner edge on the inside bevelled off as shown at 102 in FIG. 6. On the opposite side of each of the shoes and at the outer edge, each has an extending lip as shown at 103 and an annular shoulder 104 adjacent the lip. The lip 103 engages a complementary annular shoulder 106 on the body part 65 to limit inward radially movement of the shoes. Numeral 107 designates a split ring which fits into the spaced formed between the shoulder 104 and the inner face of the end part 81 of the body 65 and around the outer surface of the lip 103.

The arcuate locking lugs or shoes 100 are adapted for radial movement and they may move radially from a position such as shown in FIG. 7 to an inward position in which they are engaged in the annular groove 41 in the part 21 of the male member. When they are in the groove 41, the male and female coupling members are locked in coupled relationship. When the male and female members are moved into coupled relationship, that is from a position as shown in FIG. 6 to that shown in FIG. 7 and then that shown in FIG. 8, the shoes 100 ride up the ramp 43 on part 21 of the male member to the part of this member of uniform diameter and then they move inwardly to the position as shown in FIG. 8. In this position, the sleeve 12 is unlatched by the keys 87 and it moves to the position shown in FIG. 8 in which the skirt 80 at the end of the sleeve is around the outside of the shoes 100 in their inward locking position. The coupling cannot now be uncoupled unless the sleeve 12 is manually retracted and the male and female members are pulled apart. When they are pulled apart, the small bevel 42 on the part 21 of the male member engages the bevels 102 on the shoes 100 urging them outward radially to unlocking position allowing uncoupling of the parts. The shoes 100 are otherwise in their inward reacted position and if desired, a resilient snap ring or garter spring may be used in the position of the sealing member 107 to urge the shoes inwardly.

The complete overall operation of the quick-disconnected coupling will now be summarized. FIG. 6 shows the relative position of the parts in uncoupled relationship. The sleeve 12 is retracted and latched in that position by the keys 87 which are in the position as shown in FIG. 6. The valve at the end of the male coupling member 11 is closed as is the valve at the end of the female coupling member 10. To make the coupling, the male member is inserted into the female member in the manner shown in FIG. 7. In this figure, the valve head 31 has just come into engagement with the head member 55 of the valve in the female member, these parts having interfitting relationship as shown. The seat part of the valve in the male member is about to engage the movable sleeve valve member 61. Upon further insertion movement, the seat member at the end of the male member engages the sleeve valve member 61 moving it away from its seat on the head member 55 and moving back from sealing engagement with the sealing ring 70. The end of the male member moves into the body member 65 of the female coupling member and its exterior surface now seals against the sealing rings 70. At the same time as these events are happening, the head 55 of the female member pushes back on the valve member 31 against its spring moving it away from its seat in the end of the male member opening a path of flow through the orifice 27 therein. A flow path is now established as indicated by the arrows in FIG. 8 although this flow path might be in the reverse direction. It will be observed that the two valves open substantially simultaneously and as soon as sealing engagement of sleeve member 61 with O-ring 70 is interrupted, the end of the male member comes into sealing engagement with the O-ring 70. The coupling can accordingly be made without any leakage and without any air inclusion into the flowing stream of fluid.

At the time the foregoing events are happening, the locking shoes 100 are moved outward radially as they ride up the ramp 43 of part 21 to a position as shown in FIG. 7. Further, the keys 87 are tilted to positions as shown in FIG. 7 first and then FIG. 8 in which the sleeve 12 is unlatched. When the coupling has proceeded to a position as shown in FIG. 8, the annular groove 41 is opposite the shoes 100 and they drop into the groove to lock the parts in coupled relationship. At this time the sleeve 12 being unlatched, it is moved back by spring 77 so that its internal bore 82 moves over the exterior of the shoes 100 to hold them in locked position with the extending skirt 80 over the outside periphery of the end part 81 of the body 65 of the female coupler.

In the uncoupling operation, the sleeve 12 is merely moved back against its spring until it is latched by the key latches 87. The female and male coupling parts may now be pulled apart and as the male coupler is pulled out, the bevel 42 on the part 21 will engage the bevels 102 on the locking lugs or shoes 100 forcing them outwardly out of the annular groove 41. The inner end of the male coupler moves out of sealing engagement with the sealing ring 70 and allows the sleeve valve member 61 to recede against the head 55. Similarly, the head 55 allows the valve member 31 to recede against the valve surface on the inside of the end of the male member.

From the foregoing, those skilled in the art will observe that the invention achieves and realizes in a quick-disconnect fluid coupling the objectives and advantages outlined in the foregoing, it is to be seen that the coupling and uncoupling both can be effected by a simple and quick manipulation not requiring tools. The action is positive and dependable. No leakage is involved when the coupling is made or when the parts are uncoupled and since the sealing is continuous, there is no inclusion of air in the fluid being conveyed. All of the parts are of rugged and dependable construction requiring little if any maintenance.

The foregoing disclosure is representative of a preferred form of the invention and is to be interpreted in an illustrative rather than a limiting sense, the invention to be accorded the full scope of the claims appended hereto.

What is claimed is:

1. A coupling device comprising
a first member for transmitting fluid,
a second member for transmitting fluid,
   said first and second members having end portions which can be associated together to provide for the transmission of fluid from one of said members to the other,
a sleeve circumscribing said first member adjacent said end portion of said first member,
   said sleeve being axially slidable relative to said first member,
at least one locking member carried by said first member
   and movable inwardly toward the axis thereof, said second member having a recess adjacent said end portion of said second member for receiving said locking member when said locking member is so moved inwardly,
said sleeve having an abutment and being slidable between
   a first position in which said abutment holds said locking member in said inward position and a second position in which said abutment is remote from said locking member,
means for holding said sleeve in said second position, said last-mentioned means including
   a latching member pivotally carried by said first member and pivotal between a latched and an unlatched position, said latching member being of substantially cruciform shape having two pairs of oppositely extending arms and being pivotal about one of said pairs of arms,
      said latching member and said sleeve having abutment surfaces in engagement when said latching member is in said latched position for holding said sleeve in said second position, said abutment surface of said latching member being defined by one of the other pair of said oppositely extending arms,
   said latching member having an additional surface on the other one of said pair of arms engageable with said second member when said first and second members are advanced into said association
      to effect pivoting of said latching member to move said latching member to the unlatched position
   said abutment surface of said latching member being remote from said abutment surface of said sleeve when said latching member is in said unlatched position for permitting said sleeve to move to said first position, resilient means urging said sleeve toward said first position, and means biasing said latching member toward said latched position.

2. A device as recited in claim 1 in which
said locking member comprises an elongated member having an inner circumferential surface and an adjacent shoulder,
said first member having a slot slidably receiving said locking member,
said recess being circumferentially arranged at the periphery of said second member
   and including a shoulder engageable with said shoulder of said locking member,
      whereby there is a relatively large area of contact between said locking member and said second member.

3. A device as recited in claim 1 in which
said first member is provided with a slot receiving said locking member, and in which said locking member includes an abutment outwardly of said slot for engaging the periphery of said first member adjacent said slot when said first and second members are separated for limiting the inward movement of said locking member.

4. A coupling device comprising
a first member adapted to transmit fluid therethrough,
a second member adapted to transmit fluid therethrough,
   said first member having exterior recess means therein,
at least one locking member carried by said second member
   and movable radially inwardly into said recess means,
a sleeve circumscribing said second member,
   said sleeve being movable axially relative to said second member between a retracted position and an extended position,
      said sleeve having a surface positioned radially outwardly of said locking member when said sleeve is in said extended position for holding said locking member in said recess means,
         said surface of said sleeve being remote from said locking member when said sleeve is in said retracted position for permitting said locking member to move outwardly away from said recess means,
resilient means biasing said sleeve toward said extended position,
latching means for holding said sleeve in said retracted position,
   said latching means including at least one latching member pivotally carried by said second member,
      said sleeve having an abutment surface engageable by said latching member when said latching member is in one rotational position,
      said first member having a surface engageable with said latching member upon advancement of said first and second members toward each other for rotating said latching member to a different rotational position remote from said abutment surface for releasing said sleeve and permitting said sleeve to move to said extended position,
   said latching member being an element of substantially cruciform shape having two pairs of oppositely extending arms,
      said member being pivotal about one of said pairs of oppositely extending arms,
         one of the arms of the other pair of oppositely extending arms being engageable with said abutment surface on said sleeve, the other arm of said other pair of oppositely extending arms being engageable with said surface of said first member,
      said surface of said first member being inclined radially outwardly and axially inwardly from the outer end of said first member,
         said other arm of said other pair being slidable up said inclined surface upon said advancement of said first and second members toward each other
            for thereby pivoting said cruciform member about said one pair of arms to move said one arm of said other pair to a position remote from said abutment,
and resilient means biasing said latching member toward a position where said one arm of said other pair of arms engages said abutment surface on said sleeve.

References Cited by the Examiner

UNITED STATES PATENTS

| | | | |
|---|---|---|---|
| 1,586,276 | 5/26 | Woodruff | 285—277 |
| 2,425,500 | 8/47 | Wiggins | 285—316 |
| 2,473,973 | 6/49 | Scheiwer | 285—277 |
| 2,565,572 | 8/51 | Pangborn | 285—349 |
| 2,637,572 | 5/53 | Bruce | 285—315 |
| 2,823,934 | 2/58 | Gorrell | 285—316 |
| 2,952,482 | 9/60 | Torres | 285—320 |

FOREIGN PATENTS 1,211,696  10/59  France.

CARL W. TOMLIN, *Primary Examiner.*

THOMAS F. CALLAGHAN, *Examiner.*